United States Patent [19]

Geelhaar et al.

[11] Patent Number: 5,384,065
[45] Date of Patent: Jan. 24, 1995

[54] MATRIX LIQUID-CRYSTAL DISPLAY

[75] Inventors: Thomas Geelhaar, Mainz, Germany; Bernhard Rieger, Kanagawa, Japan; Volker Reiffenrath, Rossdorf; Ekkehard Bartmann, Erzhausen, both of Germany; David Coates, Dorset, Great Britain

[73] Assignee: Merck Patent Gesellschaft mit Beschrankter Haftung, Darmstadt, Germany

[21] Appl. No.: 754,823

[22] Filed: Sep. 4, 1991

[30] Foreign Application Priority Data

Sep. 4, 1990 [DE] Germany .................... 4027981

[51] Int. Cl.$^6$ .............. C09K 19/30; C09K 19/52; C07C 25/13; G02F 1/13
[52] U.S. Cl. .............. 252/299.63; 252/299.01; 570/127; 570/186; 359/103; 359/106; 359/93
[58] Field of Search ............. 252/299.01, 299.61, 252/299.62, 299.63, 299.64, 299.65, 299.66, 299.67; 359/103, 93, 106; 570/127, 186

[56] References Cited

U.S. PATENT DOCUMENTS

| | | | |
|---|---|---|---|
| 4,257,682 | 3/1981 | Suzuki et al. | 359/93 |
| 4,789,508 | 12/1988 | Vinet et al. | 252/299.5 |
| 4,813,770 | 3/1989 | Clerc et al. | 359/93 |
| 4,897,216 | 1/1990 | Reiffenrath et al. | 252/299.63 |
| 4,952,699 | 8/1990 | Yong et al. | 252/299.01 |
| 5,068,053 | 11/1991 | Reiffenrath et al. | 252/299.61 |
| 5,084,204 | 1/1992 | Reiffenrath et al. | 252/299.62 |
| 5,122,295 | 6/1992 | Weber et al. | 252/299.01 |
| 5,143,642 | 9/1992 | Krause et al. | 252/299.61 |
| 5,167,860 | 12/1992 | Sawada et al. | 252/299.63 |
| 5,204,019 | 4/1993 | Reiffenrath et al. | 252/299.66 |
| 5,209,866 | 5/1993 | Reiffenrath et al. | 252/299.61 |

OTHER PUBLICATIONS

CA: 112(6): 45848e, Reiffenrath et al, 1989.
CA 112(18): 169208r, Reiffenrath et al, 1989.
CA 111(22): 206070s, Reiffenrath et al, 1989.

Primary Examiner—Shean Wu
Attorney, Agent, or Firm—Millen, White, Zelano, & Branigan

[57] ABSTRACT

The invention relates to a matrix liquid-crystal display based on the principle of electrically controlled birefringence, having two plane-parallel outer plates, which, together with a frame, form a cell, integrated nonlinear elements for switching individual pixels on the outer plates, a nematic liquid-crystal mixture of negative dielectric anisotropy and high specific resistance which is located in the cell, electrode layers covered by alignment layers on the insides of the outer plates, and a tilt angle between the longitudinal axis of the molecules at the surface of the outer plates and the outer plates of from about 85 degrees to 95 degrees, in which the nematic liquid-crystal mixture contains at least one compound which contains a structural element of the formula 1, 2 or 3

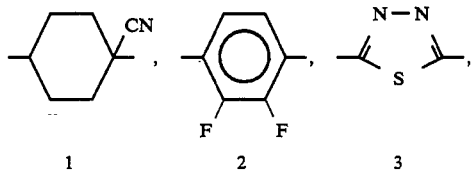

and to a process for the production thereof and to the nematic liquid-crystal mixture it contains.

7 Claims, No Drawings

MATRIX LIQUID-CRYSTAL DISPLAY

BACKGROUND OF THE INVENTION

The invention relates to a matrix liquid-crystal display based on the principle of electrically controlled birefringence, having two plane-parallel outer plates, which, together with a frame, form a cell, integrated nonlinear elements for switching individual pixels on the outer plates, a nematic liquid-crystal mixture of negative dielectric anisotropy and high specific resistance which is located in the cell, electrode layers covered by alignment layers on the insides of the outer plates, and a tilt angle between the longitudinal axis of the molecules at the surface of the outer plates and the outer plates of from about 85 degrees to 95 degrees, characterized in that the nematic liquid-crystal mixture contains at least one compound which contains a structural element of the formula 1, 2 or 3

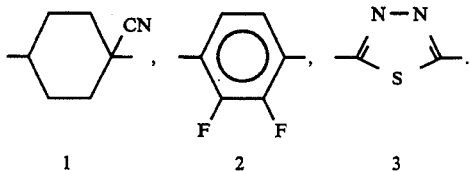

The principle of electrically controlled birefringence, the ECB effect, or the DAP effect (deformation of aligned phases) were described for the first time in 1971 (M. F. Schieckel and K. Fahrenschon. "Deformation of nematic liquid crystals with vertical orientation in electrical fields", Appl. Phys. Lett. 19 (1971), 3912). This was followed by papers by J. F. Kahn (Appl. Phys. Lett., 20 (1972), 1193) and G. Labrunie and J. Robert (J. Appl. Phys., 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta\epsilon$ of between $-0.5$ and $-5$ in order to be practicable for high-information display elements based on the ECB effect. Electrooptical display elements based on the ECB effect have a homeotropic edge alignment.

For industrial application of this effect in electrooptical display elements, LC phases which must satisfy a wide range of demands are required. Particularly important here are the chemical resistance to moisture, air and physical influences, such as heat, infra-red, visible and ultra-violet radiation, and direct and alternating electrical fields. Furthermore, industrially useful LC phases are required to have a liquid-crystalline mesophase in a suitable temperature range and low viscosity.

None of the series of compounds having a liquid-crystalline mesophase which have been disclosed hitherto contains a single compound which meets all these requirements. For this reason, mixtures of from two to 25, preferably from three to 18, compounds are generally prepared in order to obtain substances which can be used as LC phases. However, ideal phases cannot easily be prepared in this way since there were hitherto no liquid-crystal materials available which have significantly negative dielectric anisotropy and adequate long-term stability.

Matrix liquid-crystal displays (MLC displays) as defined in the preamble are known. Nonlinear elements which can be used to individually switch the individual pixels are, for example, active elements (i.e. transistors). This is then referred to as an "active matrix", and a differentiation can be made between two types:

1. MOS (metal oxide semiconductor) transistors on a silicon wafer as substrate, and
2. thin-film transistors (TFT) on a glass plate as substrate.

In the case of type 1, the electrooptical effect used is usually dynamic scattering or the guest-host effect. The use of monocrystalline silicon as the substrate material limits the display size since even modular assembly of a number of part displays results in problems at the joints.

In the case of the more promising type 2, which is preferred, the electrooptical effect used is usually the TN effect. A differentiation is made between two technologies: TFTs comprising compound semiconductors, such as, for example, CdSe, or TFTs based on polycrystalline or amorphous silicon. Intensive research efforts are being made worldwide in the latter technology.

The TFT matrix is applied to the inside of one glass plate of the display, while the inside of the other glass plate carries the transparent counter-electrode. Compared with the size of the pixel electrode, the TFT is very small and hardly affects the image at all. This technology can also be extended to fully color-capable image displays, where a mosaic of red, green and blue filters is arranged in such a manner that each filter element is located opposite a switchable image element.

The TFT displays disclosed hitherto usually operate as TN cells with crossed polarizers in transmitted light and are illuminated from the back.

The term MLC display here covers any matrix display containing integrated nonlinear elements, i.e. in addition to the active matrix, also displays containing passive elements, such as varistors or diodes (MIM=-metal-insulator-metal).

MLC displays of this type are particularly suitable for TV applications (for example pocket TV sets) or for high-information displays in automobile or aircraft construction. In addition to problems with respect to the angle dependency of the contrast and the response times, problems result in MLC displays due to inadequate specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, Sept. 1984: A 210–288 Matrix LCD Controlled by Double Stage Diode Rings, p. 141 ff, Paris; STROMER, M., Proc. Eurodisplay 84, Sept. 1984: Design of Thin Film Transistors for Matrix Addressing of Television Liquid Crystal Displays, p. 145 ff, Paris]. As the resistance decreases, the contrast of an MLC display worsens. Since the specific resistance of the liquid-crystal mixture generally decreases over the life of an MLC display due to interactions with the internal surfaces of the display, a high (initial) resistance is very important for displays which are required to have acceptable resistance values over a long service life.

The disadvantage of the MLC-TN displays disclosed hitherto is their comparatively low contrast, the relatively high angle dependence and the difficulty of generating grey shades in these displays.

There thus continues to be a great demand for MLC displays having very high specific resistance and at the same time a broad operating temperature range, short response times and low threshold voltage which can be used to generate various grey shades.

SUMMARY OF THE INVENTION

The invention has the object of providing MLC displays which are based on the ECB effect and do not have the abovementioned disadvantages, or only do so to a lesser extent, and simultaneously have very high specific resistances.

Other objectives of this invention are to provide methods for preparing such displays and to provide mixtures upon which these displays are based.

Upon further study of the specification and appended claims, further objects and advantages of this invention will become apparent to those skilled in the art.

It has now been found that these objects can be achieved if nematic liquid-crystal mixtures which contain at least one compound which contains a structural element of the formula 1, 2 or 3

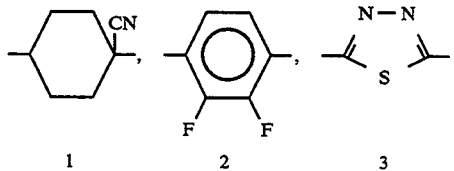

are used in these display elements.

The invention thus relates to a matrix liquid-crystal display based on the principle of electrically controlled birefringence, having two plane-parallel outer plates, which, together with a frame, form a cell, integrated nonlinear elements for switching individual pixels on the outer plates, a nematic liquid-crystal mixture of negative dielectric anisotropy and high specific resistance which is located in the cell, electrode layers covered by alignment layers on the insides of the outer plates, and a tilt angle between the longitudinal axis of the molecules at the surface of the outer plates and the outer plates of from about 85 degrees to 95 degrees, in which the nematic liquid-crystal mixture contains at least one compound which contains a structural element of the formula 1, 2 or 3

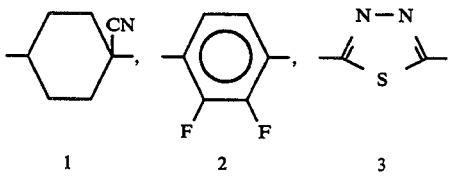

in particular a display in which the liquid-crystal mixture has a nematic phase range of at least 60 K and a maximum viscosity of 30 mPa.s at 20° C., and/or in which the liquid-crystal mixture has a $\Delta\epsilon$ of from about $-0.5$ to $-5$, $\Delta\epsilon$ being the dielectric anisotropy, and/or in which the birefringence $\Delta n$ of the liquid-crystal mixture is between 0.04 and 0.10, and/or in which the dielectric constant $\epsilon_\eta$ is greater than or equal to 3.

Particular preference is given to displays of this type in which the liquid-crystal mixture contains at least one compound of the formula I

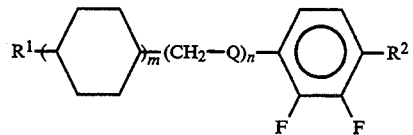

in which $R^1$ and $R^2$ are each, independently of one another, an alkyl or alkenyl radical having up to 16 carbon atoms, preferably 2 to 12 C atoms, particularly preferably 2–7 C atoms, it being possible for one or two CH2 groups in these radicals to be replaced by —O— or —S—, Q is O or CH2, m is 1 or 2, and n is 0 or 1.

Preference is furthermore given to displays of this type in which the liquid-crystal mixture contains at least one compound of the formula II

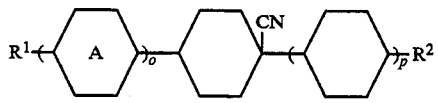

in which $R^1$ and $R^2$ are as defined for the formula I, and

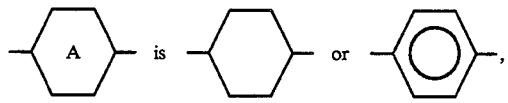

o is 1 or 2, and p is 0 or 1.

A preferred embodiment of this invention is represented by displays in which the liquid-crystal mixture contains, in addition to the compounds which contain a structural element of the formula 1, 2 or 3, at least one compound of formula III

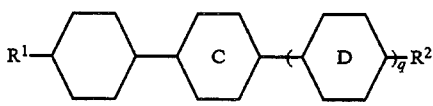

in which $R^1$ and $R^2$ are as defined for the formula I,

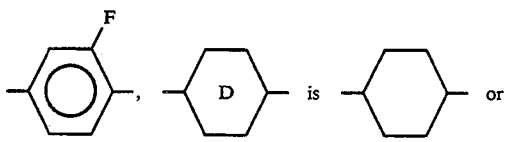

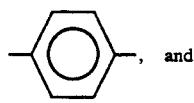, and q is 0, 1 or 2,
it being possible for the rings

to be identical or different in the case where q=2.

In addition, the invention relates to a process for the production of a liquid-crystal display based on the principle of electrically controlled birefringence and having a steep characteristic line and
- two plane-parallel outer plates, which, together with a frame, form a cell,
- integrated nonlinear elements for switching individual pixels on the outer plates,
- a nematic liquid-crystal mixture of negative dielectric anisotropy and high specific resistance which is located in the cell,
- electrode layers covered by alignment layers on the insides of the outer plates, and
- a tilt angle between the longitudinal axis of the molecules at the surface of the outer plates and the outer plates of from about 85 degrees to 95 degrees, the cell being filled with a nematic liquid-crystal mixture which contains at least one compound containing the structural element

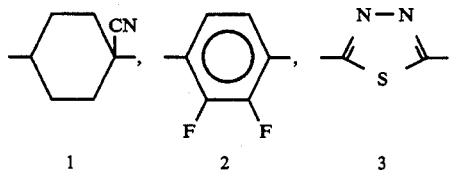

The invention likewise relates to the nematic liquid-crystal mixtures used in the displays described above.

Of the compounds which contain a structural element of the formula 1, particular preference is given to the carbonitriles of the formula IV $$R^4-(A^o-Z^o)_p-A-R^5 \quad IV$$

in which
R$^4$ and R$^5$ are each, independently of one another, an alkyl group, in each case having 1 to 15 carbon atoms, preferably 2 to 12 C atoms, particularly preferably 2-7 C atoms, in which one or more CH$_2$ groups may be replaced by a group selected from the series comprising —O—, —S—, —CO—, —CH— halogen—, —CHCN—, —O—CO—, —O—COO—, —CO—O— and —CH=CH— or by a combination of two suitable groups, but in which two heteroatoms are not linked direction to one another, A is 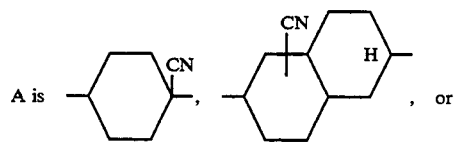, or

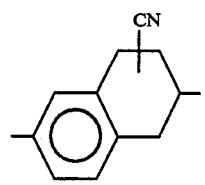

or one of these groups in which one or more CH$_2$ groups have been replaced by O and/or S or aliphatic and/or aromatic CH groups have been replaced by N,
A$^o$ is, in each case independently, 1,4-cyclohexylene which is unsubstituted or monosubstituted or polysubstituted by halogen atoms, CH$_3$ groups and/or nitrile groups and in which one or two nonadjacent CH$_2$ groups may be replaced by —O— and/or —S— and/or one —CH—CH$_2$— group may be replaced by —C≡N— (Cy), or is 1,4-phenylene which is unsubstituted or monosubstituted or polysubstituted by halogen atoms, CH$_3$ groups and/or nitrile groups and in which one or more CH groups may be replaced by N (Ph), or one of the radicals A$^o$ is alternatively 2,6-naphthylene (Na) or tetrahydro-2,6-naphthylene (4H-Na), optionally substituted by halogen or CN,
Z$^o$ is in each case, independently, —CO—O—, —O—CO—, —CH$_2$O—, —OCH$_2$—, —CH$_2$CH$_2$—, —CHCN—CH$_2$—, —CH$_2$—CHCN— or a single bond, and
p is 1, 2 or 3.

Of the compounds which contain a structural element of the formula 2 or 3, preference is given to the compounds of the formula V

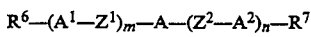

in which
R$^6$ and R$^7$ are each, independently of one another, an alkyl group, in each case having 1 to 15 carbon atoms, preferably 2 to 12 C atoms, particularly preferably 2-7 C atoms, in which one or more CH$_2$ groups may be replaced by a group selected from the series comprising —O—, —S—, —CO—, —CH—halogen—, —CHCN—, —O—CO—, —O—COO—, —CO—O— and —CH=CH— or alternatively by a combination of two suitable groups, but in which two heteroatoms are not linked directly to one another,
A$^1$ and A$^2$ are each, independently of one another, 1,4-cyclohexylene which is unsubstituted or monosubstituted or polysubstituted by halogen atoms, CH$_2$ groups and/or nitrile groups and in which one or two nonadjacent CH$_2$ groups may be replaced by —O— and/or —S— and/or one —CH—CH$_2$— group may be replaced by —C≡N— (Cy), or is 1,4-phenylene which is unsubstituted or monosubstituted or polysubstituted by halogen atoms, CH$_3$ groups and/or nitrile groups and in which one or more CH groups may be replaced by N (Ph), or one of the radicals A$^o$ is alternatively 2,6-naphthylene (Na) or tetrahydro-2,6-naphthylene (4H-Na), optionally substituted by halogen or CN, A is thiadiazo-2,5-diyl or 2,3-difluoro-1,4-phenylene, $Z^1$ and $Z^2$ are each —CO—O—, —O—CO—, —CH$_2$CH$_2$—, —OCH$_2$—, —CH$_2$O— or a single bond, m is 1 or 2, and n is 0 or 1, it being possible for the two groups $A^1$ and $Z^1$ to be identical to or different from one another in the case where m=2.

In addition, the displays according to the invention may additionally contain a compound of the formula VI

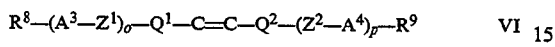
$$R^8-(A^3-Z^1)_o-Q^1-C\!\!=\!\!C-Q^2-(Z^2-A^4)_p-R^9 \qquad VI$$

in which $R^8$ and $R^9$ are each, independently of one another, an alkyl group, in each case having 1 to 15 carbon atoms, preferably 2 to 12 C atoms, particularly preferably 2-7 C atoms, in which one or more CH$_2$ groups may be replaced by a group selected from the series comprising —O—, —S—, —CO—, —CH—halogen—, —CHCN—, —O—CO—, —O—COO—, —CO—O— and —CH=CH— or alternatively by a combination of two suitable groups, but in which two heteroatoms are not linked directly to one another, $Q^1$ and $Q^2$ are each, independently of one another, 1,4-phenylene which is unsubstituted or monosubstituted or polysubstituted by halogen atoms, CH$_3$ groups and/or nitrile groups, $A^3$ and $A^4$ are each, independently of one another, trans-1,4-cyclohexylene in which, in addition, one or two nonadjacent CH$_2$ groups may be replaced by —O— and/or —S—, or are 1,4-phenylene in which, in addition, one or more CH groups may be replaced by N, o and p are each, independently of one another, 0 or 1, and $Z^1$ and $Z^2$ are as defined for the formula V Finally, the displays according to the invention may additionally contain a compound of the formula VII $$R^8-(A^1-Z^1)_m-Q^1-C\!\!=\!\!C-R^{10} \qquad VII$$

in which $R^{10}$ is an alkyl group having 1 to 15 carbon atoms, preferably 2 to 12 C atoms, particularly preferably 2-7 C atoms, and $R^8$, $A^1$, $Z^1$, $Q^1$ and m are as defined above.

The nematic liquid-crystal mixtures are prepared in a manner which is conventional per se. In general, the desired amount of the components used in the lesser amount are dissolved in the components making up the principle constituents, expediently at elevated temperature. It is also possible to mix solutions of the components in an organic solvent, for example in acetone, chloroform or methanol, and, after mixing, to remove the solvent again, for example by distillation.

The dielectrics may also contain other additives which are known to persons skilled in the art and are described in the literature. For example, 0–15% of pleochroic dyes can be added, furthermore conducive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. Volume 24, pages 249-258 (1973)), to improve the conductivity or substances can be added to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the formulae I to VII of the liquid-crystal phases according to the invention are either known or their preparation methods can easily be derived from the prior art by a person skilled in the relevant art since they are based on standard methods described in the literature.

Corresponding compounds of the formulae I and V are described, for example, in WO 89-8637, DE 39 06 019 and DE 39 06 052. DE 37 12 995 discloses compounds containing the structural element of formula 3.

Corresponding compounds of formulae II and IV are described, for example, in DE 32 31 707, which corresponds to U.S. Pat. Nos. 4,510,069, and 4,986,931.

Some of the compounds of the formula III are described in DE 29 27 277, DE 26 36 684, DE 29 48 836, DE 31 17 152, DE 32 11 601 and DE 33 21 373 and D. Demus et al., Flüssige Kristalle in Tabellen II [Liquid Crystals in Tables II], VEB Deutscher Verlag für Grundstoffindustrie, Leipzig, 1984.

The compounds of the formula VI are described, for example, in WO 88-07514 and DE 22 26 376.

The compounds of the formula VII are described, for example, in JP-60/202,830, JP-61/263,933 and DE 37 34 517.

The nematic liquid-crystal mixtures of the displays according to the invention preferably contain at least 5% of compounds of the formula I, particularly preferably from 7 to 50% of compounds of the formula I.

These mixtures preferably contain at least one laterally fluorinated compound of the formula IV in which the sum of m, n and o is 1 or 2, in particular in which one of the indices m, n and o is 2.

The nematic liquid-crystal mixtures preferably contain at least 10% of compounds of the formula II, particularly preferably from 10 to 30% of compounds of the formula II or IV. The phases according to the invention preferably contain at least one compound of the formula II or IV in which A is a 1- or 4-CN substituted 1,4-cyclohexylene group, in particular a group of the formula

containing a nitrile group in the axial position. $R^4$ and $R^5$ are preferably straight-chain alkyl or alkoxy, in particular alkyl, preferably having 2 to 7 carbon atoms. $A^o$ is preferably, in each case independently, trans-1,4-cyclohexylene, 1,4-phenylene (unsubstituted or fluorine-substituted), pyrimidine-2,5-diyl or pyridine-2,5-diyl. $Z^o$ is preferably in each case a single bond. p is preferably 1 or 2.

Particularly preferred compounds of the formula IV are those of the subformulae IVa to IVc:

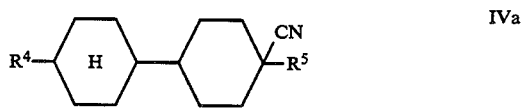

IVa

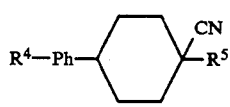  IVb

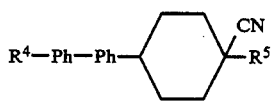  IVc

Particular preference is given to compounds of the subformulae IVa and IVc. —Ph—Ph— is preferably

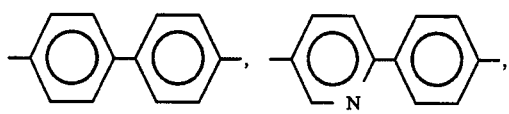

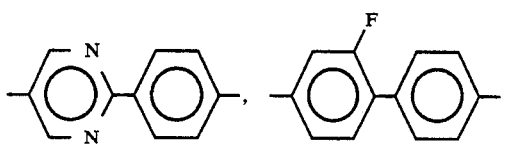

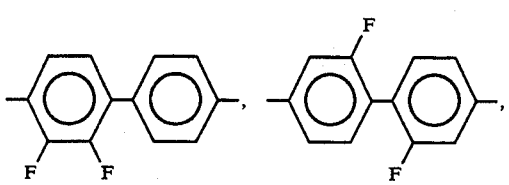

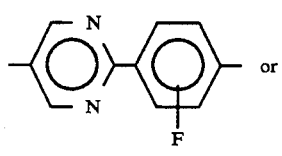 or

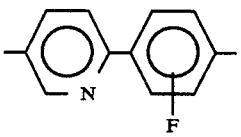

or the mirror image of the asymmetrical groups.

Preferred nematic liquid-crystal mixtures contain at least one compound of the formula IVa, in particular at least one laterally fluorinated compound of the formula IVc. Preference is furthermore given to nematic liquid-crystal mixtures containing compounds of the formula IVa and compounds of the formula V.

Preferred phases contain from 30 to 90%, in particular from 49 to 86%, of compounds of the formula V.

$R^6$ and $R^7$ are preferably each, independently of one another, alkyl or alkoxy having 2 to 7 carbon atoms. m is preferably 1. $A^1$ and $A^2$ are preferably each, independently of one another, trans-1,4-cyclohexylene or 1,4-phenylene. $Z^1$ and $Z^2$ are each, independently of one another, preferably —CO—O—, —O—CO—, —CH$_2$CH$_2$— or a single bond, particularly preferably —CH$_2$CH$_2$— or a single bond. Particularly preferred compounds of the formula V are those of the subformulae Va to Vm wherein A is thiadiazo-2,5-diyl or 2,3-difluoro-1,4-phenyl and $R^6$ and $R^7$ are as defined in formula V.

Particular preference is given to compounds of the subformulae Va, Vb, Vc, Vh and Vj, in particular in which —A— is 2,3-difluoro-1,4-phenylene.

Particularly preferred phases furthermore contain at least one component of the formula VI and/or VII. $R^3$ is preferably straight-chain alkyl or alkoxy, in each case having 2 to 7 carbon atoms. $R^6$ and $R^7$ are each preferably straight-chain alkyl having 1 to 7 carbon atoms. $Q^1$ and $Q^2$ are each, independently of one another, preferably 1,4-phenylene or fluorine-substituted 1,4-phenylene. $A^1$, $A^3$ and $A^4$ are each, independently of one another, preferably trans-1,4-cyclohexylene or 1,4-phenylene. $Z^1$ and $Z^2$ are each preferably single bonds.

The nematic liquid-crystal mixtures in the displays according to the invention generally contain two components A and B, which themselves comprise one or more individual compounds.

Component A has significantly negative dielectric anisotropy and gives the nematic phase a dielectric anisotropy of $\leq -0.3$. It preferably contains compounds of the formula V, in particular of the formula Va, and/or compounds of the formula IV containing a

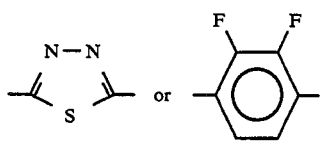

group, in particular compounds of the formulae Va, Vb, Vh, Vi, Vj and Vk. The proportion of component A is between 8% and 50%.

For component A, one (or more) individual compound(s) is(are) preferably selected which has(have) a value for $\Delta\epsilon$ of $\leq 0.5$, preferably $\leq -0.8$. This value must be more negative the smaller the proportion of A in the total mixture.

If the proportion of component A is very high, the value for $\Delta\epsilon$ of component A may also be only slightly negative, for example in the range from $-0.5$ to $-1.0$. In addition to said preferred compounds of the formulae IV and V containing a structural element of the formula

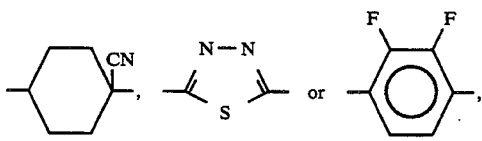

preferred constituents of component A are, furthermore, laterally fluorinated compounds of the formula I, in particular those which contain a structural element of the formula

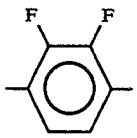

and tolan derivatives of the formula VI containing the structural element:

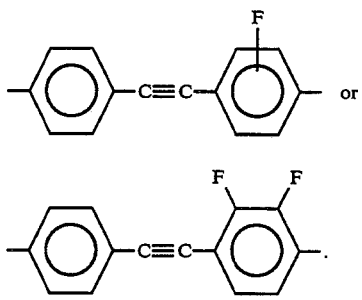

Component B has pronounced nematogeneity and a viscosity of not more than 30 mm²s⁻¹, preferably not more than 25 mm²s⁻¹, at 20° C.

Particularly preferred individual compounds of component B are extremely low-viscosity nematic liquid crystals having a viscosity of not more than 18 mm²s⁻¹, preferably not more than 12 mm²s⁻¹, at 20° C. Component B is monotropic or enantiotropic nematic, has no smectic phases and can prevent the occurrence of smectic phases in liquid-crystal mixtures down to very low temperatures. For example, if different materials of high nematogeneity are in each case added to a smectic liquid-crystal mixture, the nematogeneity of these materials can be compared through the degree of suppression of smectic phases achieved.

A large number of suitable materials are known from the literature to a person skilled in the art. Particular preference is given to compounds of the formula VIII

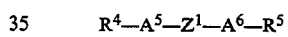

in which $R^4$ and $R^5$ are as defined for the formula IV,
$Z^1$ is —COO—, —O—CO—, —CH₂CH₂—, —OCH₂—, —CH₂O— or a single bond, and
$A^5$ and $A^6$ are each, independently of one another, trans-1,4-cyclohexylene or unsubstituted or fluorine-substituted 1,4-phenylene.

The liquid-crystal phases of the liquid-crystal displays according to the invention preferably comprise from 2 to 15 components, preferably from 3 to 18 components.

In addition, these liquid-crystal phases may alternatively contain more than 18 components, preferably from 18 to 25 components.

The phases preferably contain from 2 to 10, in particular from 3 to 5, compounds of the formula I or V, in particular of the formulae Va, Vc, Ve, Vk, Vl and Vm, and from 2 to 10, in particular from 4 to 8, compounds of the formula III, in particular selected from the compounds of the formulae IIIa to IIIc

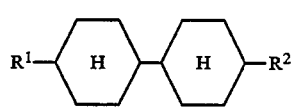
IIIa

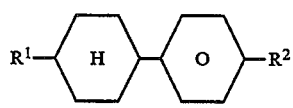
IIIb

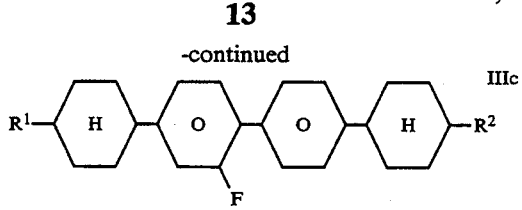

IIIc

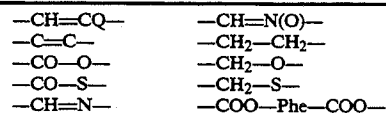

| | |
|---|---|
| —CH=CQ— | —CH=N(O)— |
| —C≡C— | —CH$_2$—CH$_2$— |
| —CO—O— | —CH$_2$—O— |
| —CO—S— | —CH$_2$—S— |
| —CH=N— | —COO—Phe—COO— |

In addition to compounds of the formulae I to VIII, it is also possible for other constituents to be present, for example in an amount of up to 45% of the total mixture, but preferably up to 34%, in particular up to 10%.

The other constituents are preferably selected from nematic or nematogenic substances, in particular known substances, from the classes comprising the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-bis- or cyclohexylpyrimidines, phenyl- or cyclohexyldioxanes, optionally halogenated stilbenes, benzyl phenyl ethers, tolans and substituted cinnamic acids.

The most important compounds which are suitable as components of liquid-crystal phases of this type can be characterized by the formula IX $$R^{10}—L—G—E—R^{11} \qquad IX$$

in which L and E are each a carbocyclic or heterocyclic ring system from the group comprising 1,4-disubstituted benzene and cyclohexane rings, 4,4′-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

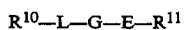

G is —CH=CH— —N(O)=N— a C—C single bond, Q is halogen, preferably chlorine, or —CN, and $R^{10}$ and $R^{11}$ are each alkyl, alkoxy, alkanoyloxy or alkoxycarbonyloxy having up to 18, preferably up to 8, carbon atoms, or one of these radicals is alternatively CN, NC, NO$_2$, CF$_3$, F, Cl or Br.

In most of these compounds, $R^{10}$ and $R^{11}$ are different from one another, one of these radicals usually being an alkyl or alkoxy group. However, other variants of the proposed substituents are also common. Many such substances or mixtures thereof are commercially available. All these substances can be prepared by methods which are known from the literature.

The structure of the liquid-crystal displays according to the invention corresponds to the conventional geometry, as described, for example, in EP-A 0 240 379.

Without further elaboration, it is believed that one skilled in the art can, using the preceding description, utilize the present invention to its fullest extent. The following preferred 'specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Federal Republic of Germany P 40 27 981.2, filed Sep. 4, 1990, are hereby incorporated by reference.

The following abbreviations are used:

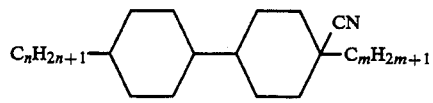

CCNnm

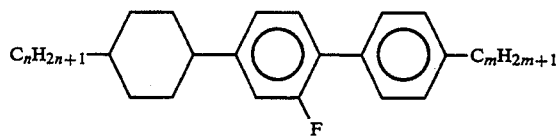

BCHn.Fm

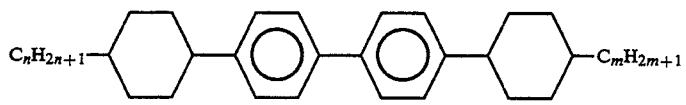

CBCnm

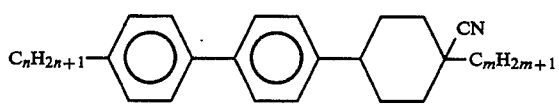

NCBnm

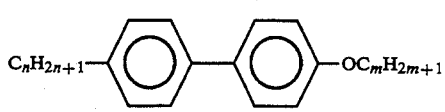

BnOm

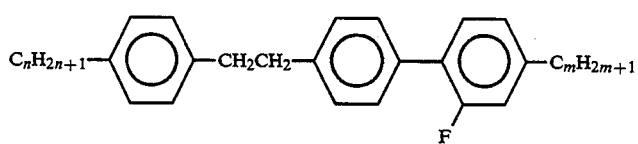 BEP-nmF
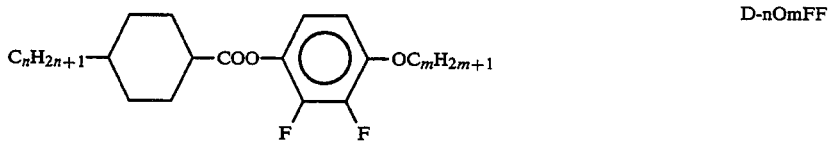 D-nOmFF
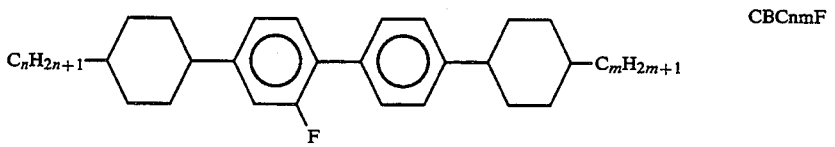 CBCnmF
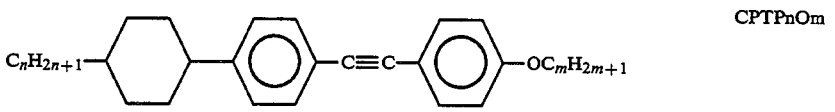 CPTPnOm
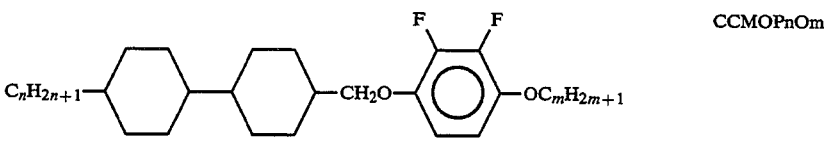 CCMOPnOm
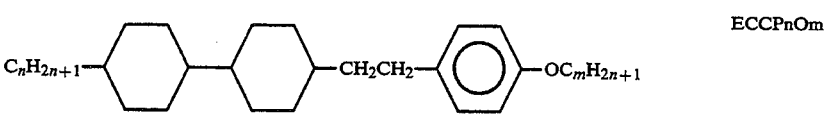 ECCPnOm
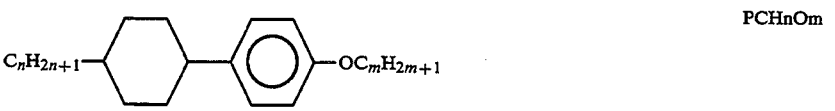 PCHnOm
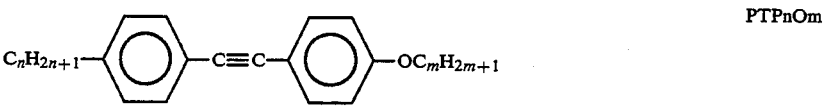 PTPnOm
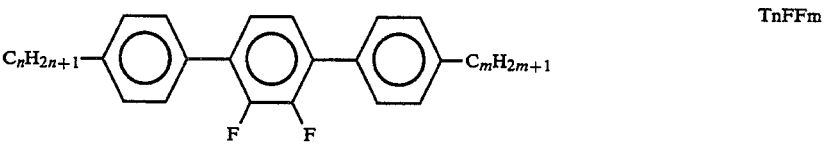 TnFFm
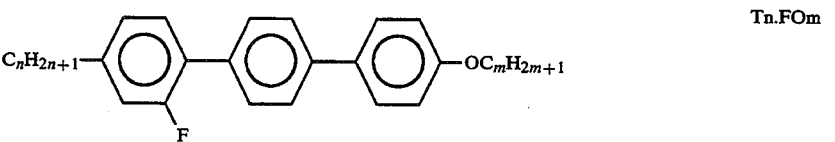 Tn.FOm
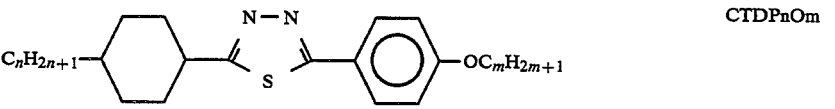 CTDPnOm
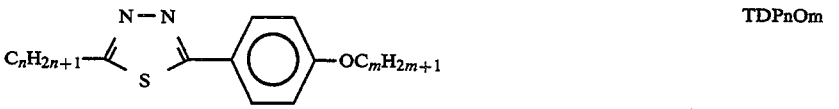 TDPnOm

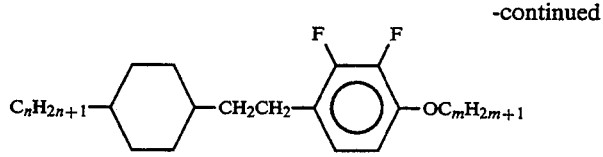 EPCHnOmFF

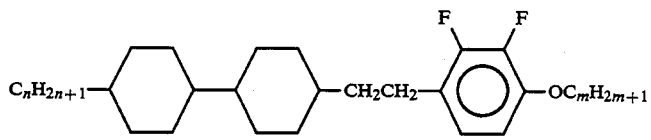 ECCPnOmFF

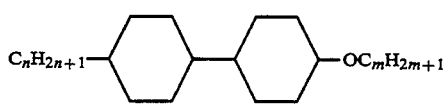 CCHnOm

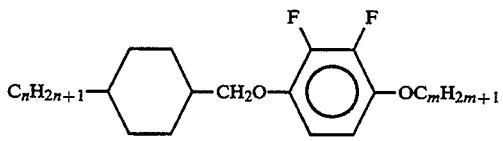 CMOPnOmFF

The threshold voltage values V (0,0), V (10,0) and V (90,0) indicated were measured at 20° C. in a conventional ECB cell having a layer thickness of 5 μm.

In addition:

V (0,0) is the threshold voltage [V] at 0% transmission and a viewing angle of 0°

V (10,0) is the threshold voltage [V] at 10% transmission and a viewing angle of 0°

V (90,0) is the threshold voltage [V] at 90% transmission and a viewing angle of 0°

Δn is the optical anisotropy measured at 20° C. and 589 nm

Δε is the dielectric anisotropy at 20° C.

c.p. is the clearing point [°C]

$\eta(T)$ is the viscosity [mm²s⁻¹] at T°C.

S is the steepness of the characteristic line $$S = \frac{V(90,0)}{V(10,0)} - 1 \cdot 100$$

$\eta$ is the specific resistance [Ω.cm]

The display used for measurement of the threshold voltage has two plane-parallel outer plates at a separation of 5 μm and electrode layers covered by lecithin alignment layers on the insides of the outer plates, causing a homeotropic alignment of the liquid crystals.

EXAMPLE 1

A mixture is prepared which comprises

| Constituent | % by weight |
|---|---|
| CMOP-502FF | 9.0 |
| EPCH-502FF | 11.0 |
| CCMOP-302FF | 14.0 |
| CCMOP-502FF | 8.0 |
| ECCP-302FF | 15.0 |
| CCH-302 | 10.0 |
| CCH-303 | 12.0 |
| CCH-501 | 9.0 |
| CCH-502 | 12.0 | and its physical data are given in Table I.

TABLE I

| c.p. | +80 | V (0, 0) | 2.3 (DAP) |

TABLE I-continued

| Δn | +0.072 |
|---|---|

EXAMPLE 2

A liquid-crystalline phase is prepared which comprises

| Constituent | % by weight |
|---|---|
| CCN-47 | 17.0 |
| CCN-55 | 16.0 |
| CCH-302 | 9.0 |
| CCH-303 | 13.0 |
| CCH-501 | 10.0 |
| CCH-502 | 10.0 |
| PCH-301 | 10.0 |
| CBC-33F | 5.0 |
| CBC-53F | 5.0 |
| CBC-55F | 5.0 | and its physical data are given in Table II.

TABLE II

| c.p. | 72 | V (0, 0) | 2.7 (DAP) |
|---|---|---|---|
| η (20) | 24 | ρ | >1 · 10¹² Ω · cm |
| η (0) | 70 | | |
| η (−20) | 285 | | |
| η (−30) | 750 | | |
| Δn | 0.060 | | |
| Δε | −2.1 | | |
| ε∥ | 3.3 | | |
| ε⊥ | 5.4 | | |

EXAMPLE 3

A liquid-crystalline phase is prepared which comprises:

| Constituent | % by weight |
|---|---|
| EPCH-502FF | 9 |
| CMOP-502FF | 5 |
| CCP-502FF | 14 |
| CCMOP-302FF | 14 |
| CCH-302 | 14 |
| CCH-303 | 14 |

-continued

| Constituent | % by weight |
| --- | --- |
| CCH-501 | 13 |
| PCH-301 | 13 |
| CBC-33F | 4 |

EXAMPLE 4

A nematic liquid-crystal mixture is prepared which comprises:

| Constituent | % by weight |
| --- | --- |
| CCN-47 | 12 |
| NCB-45 | 5 |
| CCH-302 | 13 |
| CCH-303 | 7 |
| CCH-501 | 7 |
| PCH-301 | 7 |
| CBC-33 | 5 |
| CBC-53F | 7 |
| ECCP-302 | 19 |
| ECCP-502 | 18 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An active liquid-crystal display based on the principle of electrically controlled birefringence, having
   two plane-parallel outer plates, which, together with a frame, form a cell,
   integrated nonlinear elements for switching individual pixels on the outer plates,
   a nematic liquid-crystal mixture of negative dielectric anisotropy and high specific resistance which is located in the cell,
   electrode layers covered by alignment layers on the insides of the outer plates, and
   a tilt angle between the longitudinal axis of the molecules at the surface of the outer plates and the outer plates of from about 85° to 95°, wherein the nematic liquid-crystal mixture has a birefringence ($\Delta n$) between 0.04 and 0.10 and a dielectric anisotropy of $-0.5$ to $-5.0$ and contains at least one compound of formula I

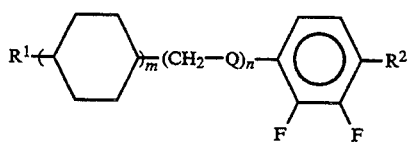

in which
   $R^1$ and $R^2$ are each independently of one another, an alkyl or alkenyl radical having up to 16 carbon atoms, it being possible for one or two $CH_2$ groups in these radicals to be replaced by —O— or —S—,
   Q is 0 or $CH_2$, m is 1 or 2 and
n is 0 or 1.

2. A display according to claim 1, wherein the liquid-crystal mixture has a nematic phase range of at least 60 K and a maximum viscosity of 30 mPa.s at 20° C.

3. A display according to claim 1, wherein the dielectric constant $\epsilon$ is greater than or equal to 3.

4. A display according to claim 1, wherein the liquid-crystal mixtures contain, in addition to the compounds of formulae I, at least one compound of the formula III

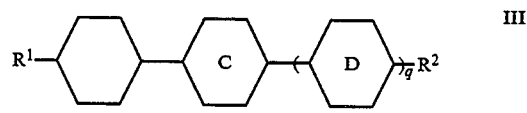

in which
   $R^1$ and $R^2$ are each, independently of one another, an alkyl or alkenyl radical having up to 16 carbon atoms, it being possible for one or two $CH_2$ groups in these radicals to be replaced by —O— or —S—,

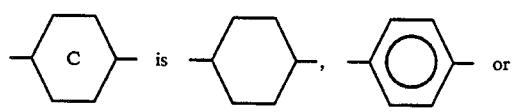

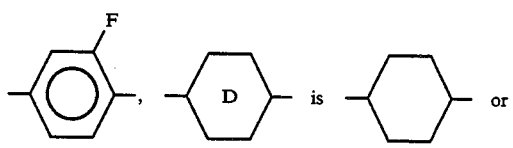

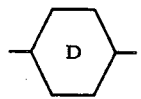, and q is 0, 1 or 2,
it being possible for the rings

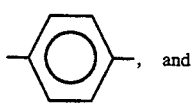

to be identical or different in the case where q=2.

5. A display according to claim 1, wherein the liquid-crystal mixture contains at least 5% of compounds of formula I.

6. A display according to claim 4, wherein the liquid-crystal mixture contains at least one compound of the formula IIIa

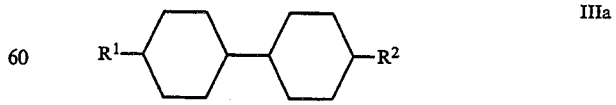

7. A display according to claim 6, wherein the liquid-crystal mixture contains 2 to 10 compounds of formula IIIa.

* * * * *